(12) United States Patent
Zhou et al.

(10) Patent No.: US 9,898,413 B2
(45) Date of Patent: Feb. 20, 2018

(54) AUTO-ADAPTIVE SYSTEM TO IMPLEMENT PARTIAL WRITE BUFFERING FOR STORAGE SYSTEMS DYNAMIC CACHING METHOD AND SYSTEM FOR DATA STORAGE SYSTEM

(71) Applicant: Shannon Systems Ltd., Shanghai (CN)

(72) Inventors: Zhen Zhou, Shanghai (CN); Xueshi Yang, Cupertino, CA (US)

(73) Assignee: SHANNON SYSTEMS LTD., Shanghai (CN)

( * ) Notice: Subject to any disclaimer, the term of this patent is extended or adjusted under 35 U.S.C. 154(b) by 2 days.

(21) Appl. No.: 15/032,817

(22) PCT Filed: Oct. 29, 2013

(86) PCT No.: PCT/CN2013/001308
§ 371 (c)(1),
(2) Date: Apr. 28, 2016

(87) PCT Pub. No.: WO2015/061921
PCT Pub. Date: May 7, 2015

(65) Prior Publication Data
US 2016/0283387 A1    Sep. 29, 2016

(51) Int. Cl.
*G06F 12/08* (2016.01)
*G06F 12/0888* (2016.01)
(Continued)

(52) U.S. Cl.
CPC .......... *G06F 12/0888* (2013.01); *G06F 3/061* (2013.01); *G06F 3/0605* (2013.01);
(Continued)

(58) Field of Classification Search
None
See application file for complete search history.

(56) References Cited

U.S. PATENT DOCUMENTS

| 4,916,605 A | 4/1990 | Beardsley et al. |
| 7,873,790 B2 * | 1/2011 | Bouchou ................. G06F 3/061 |
| | | 711/118 |

(Continued)

FOREIGN PATENT DOCUMENTS

| CN | 101866328 | 10/2010 |
| CN | 102521175 | 6/2012 |

OTHER PUBLICATIONS

International Search Report issued in application No. PCT/CN2013/001308.

*Primary Examiner* — Kaushikkumar Patel
(74) *Attorney, Agent, or Firm* — McClure, Qualey & Rodack, LLP

(57) ABSTRACT

An auto-adaptive system to implement partial write buffering for storage systems comprises: dynamically determining a wiring method for a data queue which needs to be written, and on the basis of a determination result, directly writing to a storage medium data suited to being written directly, and as for data suited for being written after being cached, caching the data by a caching device and then writing the data to the storage medium. A dynamic caching system uses the above method. The method and system significantly reduce the space requirements for caching, enable fault tolerance integration, and improve system performance.

20 Claims, 4 Drawing Sheets

(51) Int. Cl.
*G06F 13/38* (2006.01)
*G06F 3/06* (2006.01)

(52) U.S. Cl.
CPC .......... *G06F 3/0659* (2013.01); *G06F 3/0679* (2013.01); *G06F 13/385* (2013.01); *G06F 2212/1016* (2013.01); *G06F 2212/1044* (2013.01); *G06F 2212/214* (2013.01)

(56) References Cited

U.S. PATENT DOCUMENTS

| | | | |
|---|---|---|---|
| 8,285,924 B1* | 10/2012 | Cohn | G06F 1/3215 711/113 |
| 9,298,636 B1* | 3/2016 | O'Brien, III | G06F 12/0888 |
| 2004/0117441 A1* | 6/2004 | Liu | G06F 12/0888 709/203 |
| 2007/0005889 A1* | 1/2007 | Matthews | G06F 12/0888 711/118 |
| 2008/0104329 A1* | 5/2008 | Gaither | G06F 12/0888 711/138 |
| 2010/0122026 A1* | 5/2010 | Umamageswaran | G06F 12/084 711/113 |
| 2013/0318283 A1* | 11/2013 | Small | G06F 12/0246 711/103 |
| 2014/0379988 A1* | 12/2014 | Lyakhovitskiy | G06F 12/12 711/133 |
| 2015/0146322 A1* | 5/2015 | Bi | G11B 19/2009 360/99.08 |
| 2015/0286438 A1* | 10/2015 | Simionescu | G06F 12/0866 711/103 |
| 2016/0077971 A1* | 3/2016 | Maheshwari | G06F 12/0866 711/103 |

* cited by examiner

AUTO-ADAPTIVE SYSTEM TO IMPLEMENT PARTIAL WRITE BUFFERING FOR STORAGE SYSTEMS DYNAMIC CACHING METHOD AND SYSTEM FOR DATA STORAGE SYSTEM

CROSS REFERENCE TO RELATED APPLICATIONS

This application is a National Phase of WIPO Application No. PCT/CN2013/001308, filed on Oct. 29, 2013, the entirety of which is incorporated by reference herein.

TECHNICAL FIELD

The disclosure generally relates to a dynamic caching method and a system for data storage, especially a dynamic caching method and system for a solid state storage application environment.

BACKGROUND

A common method in the operation of data storage systems is to cache writing data in order to reduce writing latency and improve writing performance. Data storage technology based on NAND Flash memory has continued to develop quickly over the past 10 years. The traditional hard disk drive (HDD) has been replaced in many applications. The main reasons for this include:

High Speed: Data storage in a flash memory is different from that in a traditional HDD, which depends on the mechanical address operation of the magnetic head. Therefore, the speed of reading and writing data is substantially increased, and the strict requirements regarding data storage throughput of applications is met.

Decreasing Price: Due to progress being made in the field of semiconductor technology, flash memory storage capacity has doubled in less than two years, as described by Moore's Law, and the price per storage unit has also decreased. Recently, the price for MLC flash memory has decreased from $10USD/GB, which was the price five years ago, to less than $1USD/GB.

Progress Of The Technology Of The Controller: The flash memory needs a matching controller to communicate with the host for storing, reading, and writing data. The mature development of controller technology has contributed to the solid storage technology based on flash memory so that it can be applied in various areas, which include applications for high-end data centers and mobile smartphones.

The Solid State Disk (SSD) has brought a revolutionary improvement in the performance of data storage systems, and also carries new requests and new opportunities for the writing cache. The system structure of the SSD of the current technology is illustrated in FIG. 1. The host interface is the port of the data read-and-write command. The up-layer application transmits commands of the needed read-and-write data through the host interface. The latency for the flash to write data is about 1 ms, which is quite large, and the latency of mini-second level cannot meet the requirements for the application of key systems. Therefore, a cache module is usually arranged for the design of the controller system. The cache module could be an external DRAM or an internal SRAM in the controller. When data is written to the SSD, the controller reads the writing command and caches the writing data to the cache module. Regarding the traditional SSD design, all data is cached by the cache module, and the writing command is accomplished after the data is written to the cache. Because the writing latency of the cache module is micro-second level, the writing latency could be significantly reduced to improve system performance. During the afterward operations, the controller writes the data in the cache module to the storage medium through the data channel. The storage medium of an SSD is composed of many flash modules. The writing cache system diagram of an SSD is illustrated in FIG. 2.

However, the writing cache method of the current technology has the following problems:

Size Of The Cache: The buffer of liquid data of high bandwidth may need quite a large cache, and it cannot be performed within the controller.

Bandwidth Requirements: If the cache is arranged outside the controller, data will be transmitted from the host to the controller, and from the controller to the cache, and from the cache to the controller, and is finally written to the flash. For the chip of the controller, the bandwidth requirement is four times the user bandwidth.

Data Completeness: It is about how to confirm that the newest data is read accurately. When only a portion of data is written to the flash, it needs to be read from the cache, and it cannot be read from the flash. When the cache is larger, the complexity of determination is larger, and the performance loss is greater.

Data Completeness For Accidental Situation: When power is cut off suddenly, the data in the cache urgently needs to be written to prevent that data from being lost. The larger the cache, the greater the danger of data loss.

SUMMARY OF THE INVENTION

In order to solve the problems listed above, and achieve high performance and low cost at the same time, the present disclosure provides a dynamic caching method for a data storage system. The method makes a determination on a writing method for a data queue which needs writing, and adopts either direct writing or cache writing for writing a current-requesting writing data. In one of the determination methods, if cache writing is adopted for a current-requesting writing data and this results in the length of the cache writing data queue exceeding an upper limit Tbuf, then direct writing is adopted for the current-requesting data. Otherwise, cache writing is adopted for the current-requesting writing data. Based on a determination result, the data which needs direct writing is written directly to the storage medium; and data which needs cache writing is written to the storage medium after it is cached by a cache.

Specifically, the upper limit Tbuf of the length of the cache writing data queue could be a predetermined fixed value. It could also be dynamically adaptive. when some cache writing is finished but the corresponding cache writing data queue in the cache is not empty, the upper limit Tbuf will be decreased by a smaller value, and when some cache writing is finished but the corresponding cache writing data queue in the cache is empty, the upper limit Tbuf will be increased by a larger value.

The writing cache is composed of a number of independent modules. When one module is filled, the controller automatically writes the data module to the storage medium at the best suitable time. After the data cache is written to the storage medium, the data will be removed from the cache module, and its space could be utilized repeatedly and rapidly.

In addition, determining the data writing method could also be adopted with a static method. The direct writing method could be adopted for the assigned data type. For example, the system writing data generated by all flash documents system data manager FTL is written to the storage medium using the direct writing method, which is beneficial for saving cache space so that it can serve the user more effectively.

Furthermore, the storage medium is flash, SSD, queue based on traditional hard disk, or queue of next-generation storage medium. The cache module is SRAM within the controller chip or an external DRAM.

The present disclosure provides a dynamic caching system for a data storage system which includes a host interface, a controller, a cache and a direct writing determination module, a cache module, a data writing channel, and a storage medium. The host interface is utilized to transmit a writing data queue of an up-layer application. The controller is utilized to receive a writing data command queue from the host interface, to control devices such as the cache and the direct writing determination module, the cache module, the data writing channel, and to write data to the storage medium. The cache and the direct writing determination module performs a determination for a corresponding data module of the writing data command queue from the controller, and adopts a direct writing or a cache writing for writing a current-requesting writing data; and based on a determination result, the cache and the direct writing determination module directly writes the data which needs direct writing to the storage medium through the data writing channel, and writes the data which needs cache writing to the storage medium after it is cached by the cache module.

Specifically, if adopting cache writing for the current-requesting writing data results in the length of the cache writing data queue exceeding an upper limit Tbuf, direct writing is adopted for the current-requesting data, otherwise, cache writing is adopted for the current-requesting writing data. The upper limit Tbuf of the length of the cache writing data queue is a predetermined fixed value.

The upper limit Tbuf of the length of the cache writing data queue could also be dynamically auto-adaptive. When some cache writing is finished but the corresponding cache writing data queue in the cache is not empty, the upper limit Tbuf will be decreased by a smaller value. When some cache writing is finished but the corresponding cache writing data queue in the cache is empty, the upper limit Tbuf will be increased by a larger value.

In addition, the assigned writing method could be adopted for the assigned data type by the cache and direct write determination module. For example, the system writing data generated by all flash documents system data manager FTL is written to the storage medium by adopting the direct writing method.

Furthermore, the position of the storage medium for the cache data could be assigned in advance. When accidental events occur such as a power failure or a breakdown, the controller automatically writes a portion of data in the cache to the pre-assigned positions. The completeness of data could be guaranteed when accidental events occur.

In the method and system of the present disclosure, there are two methods of writing data: direct writing (without passing through the cache) and cache writing. The advantages of the two writing methods are combined to utilize different data types for different requirements of writing performance:

Liquid Data, such as copying data and playing video. The writing bandwidth is more stable. Users are not sensitive to the writing latency. Enough development could be achieved to meet the bandwidth requirement without a cache.

Accidental Data, such as application of the data base. There is a large deviation of the writing bandwidth and it is not predictable. Users are sensitive to the writing latency. Caching data is necessary, but a very large cache is not needed to meet requirements.

The method and system of the present disclosure provides the following function:

Automatic detecting and selecting a current data mode auto-adaptively in the time of mini-second level.

Writing data with different methods when both data methods exist to meet the application needs with the lowest system cost.

When the characteristics of the data method are not obvious, maintaining good overall system performance.

DETAILED DESCRIPTION

The present disclosure will be illustrated in detail by the following preferred embodiments.

Figure 1:
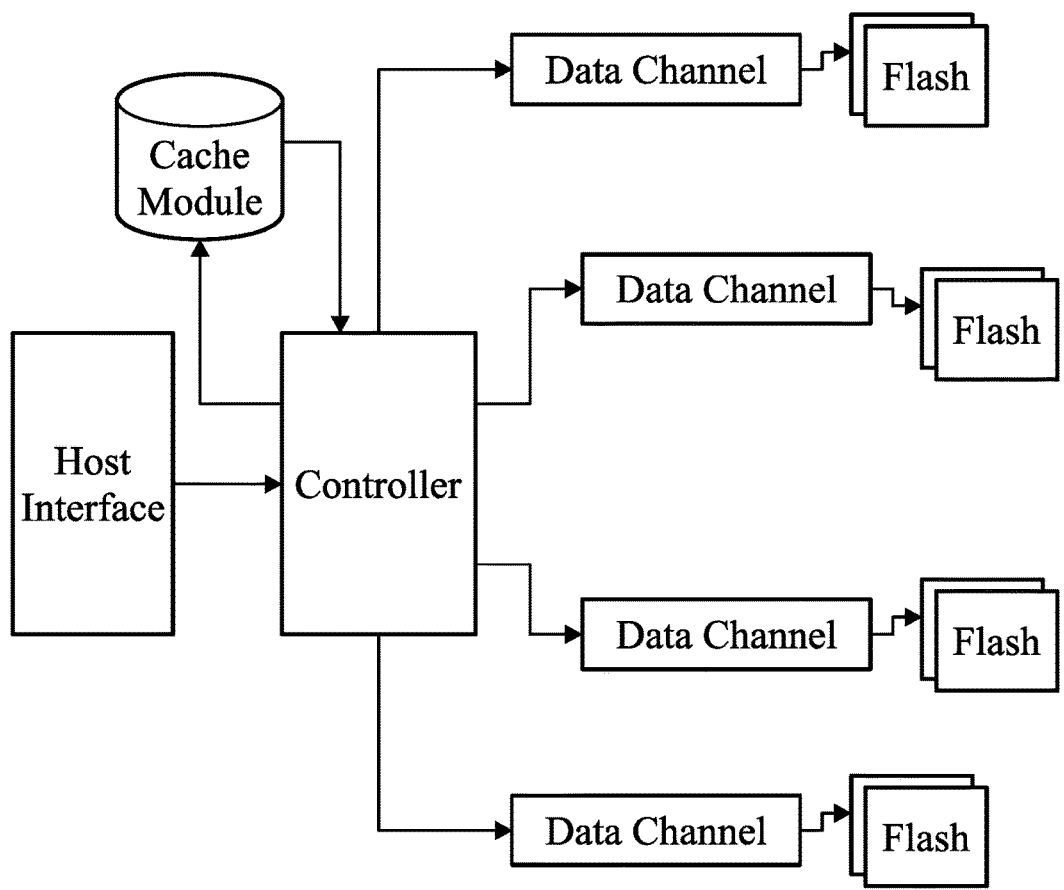
FIG. 1 illustrates the system structure of SSD of the current technology.
Figure 2:
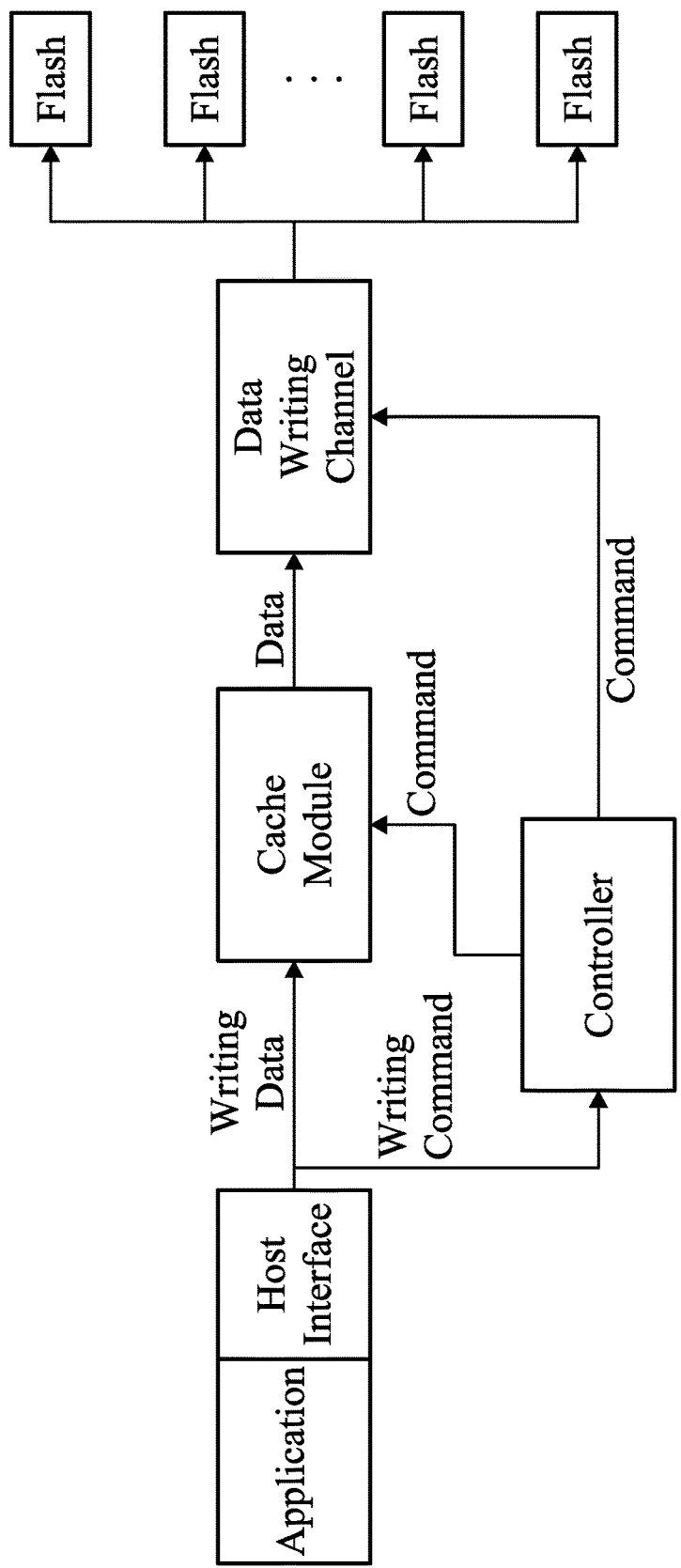
FIG. 2 is a schematic diagram illustrating the dynamic cache of SSD of the current technology.
Figure 3:
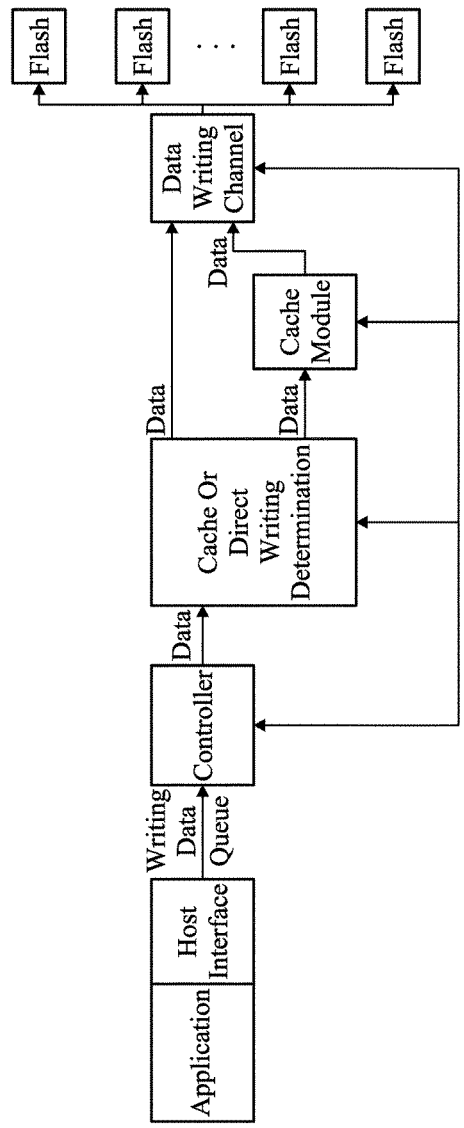
FIG. 3 is a schematic diagram of the dynamic cache by the present invention.

FIG. 3 is a schematic diagram of the dynamic cache system applied in the SSD by the present invention. The dynamic cache system of the present disclosure includes a host interface, a controller, a cache and a direct writing determination module, a cache module, a data writing channel, and a storage medium such as flash.

In the dynamic cache system, the data writing includes two methods: direct writing and cache writing. The direct writing method means that the data is cached without passing through the cache module. Data is written to flash chip or another storage medium by directly writing data to the data writing channel. By adopting the direct writing method, each flash chip could operate independently. Although the latency is longer, the limit bandwidth could be provided when it is operated in parallel. The cache writing means that after the data is cached by the cache module, it is written to the flash chip or another storage medium. Cache writing has a fast response time, but its bandwidth utilization rate is not high.

The host interface is utilized to transmit a writing data command queue of an up-layer application.

The controller is utilized to receive a writing data command queue from the host interface, and to control devices such as the cache and the direct writing determination module, the cache module, the data writing channel, and to write data to the storage medium.

The cache and the direct writing determination module performs a determination for the writing method of the writing data queue from the controller. If adopting the cache writing for the current-requesting writing data results in the length of the cache writing data queue exceeding an upper limit Tbuf, direct writing is adopted for the current-requesting data, otherwise, cache writing is adopted for the current-requesting writing data. Direct writing means that the data is written directly to the flash chip or another storage medium by directly passing through the data writing channel. Cache writing means that, after the data is cached by the cache module, it is written to the flash chip or another storage medium. The cache and the direct writing determination module could be arranged independently and outside the controller, or could be arranged within the controller.

Specifically, the upper limit Tbuf of the length of the cache writing data queue could be a predetermined fixed value, or it could be auto-adaptive based on a fixed value. For example, it could be dynamically adjusted by adopting the following methods. In other words, when some cache writing is finished but the corresponding cache writing data queue in the cache is not empty, Tbuf will be decreased by a smaller value. When some cache writing is finished but the corresponding cache writing data queue in the cache is empty, Tbuf will be increased by a larger value.

Figure 4:
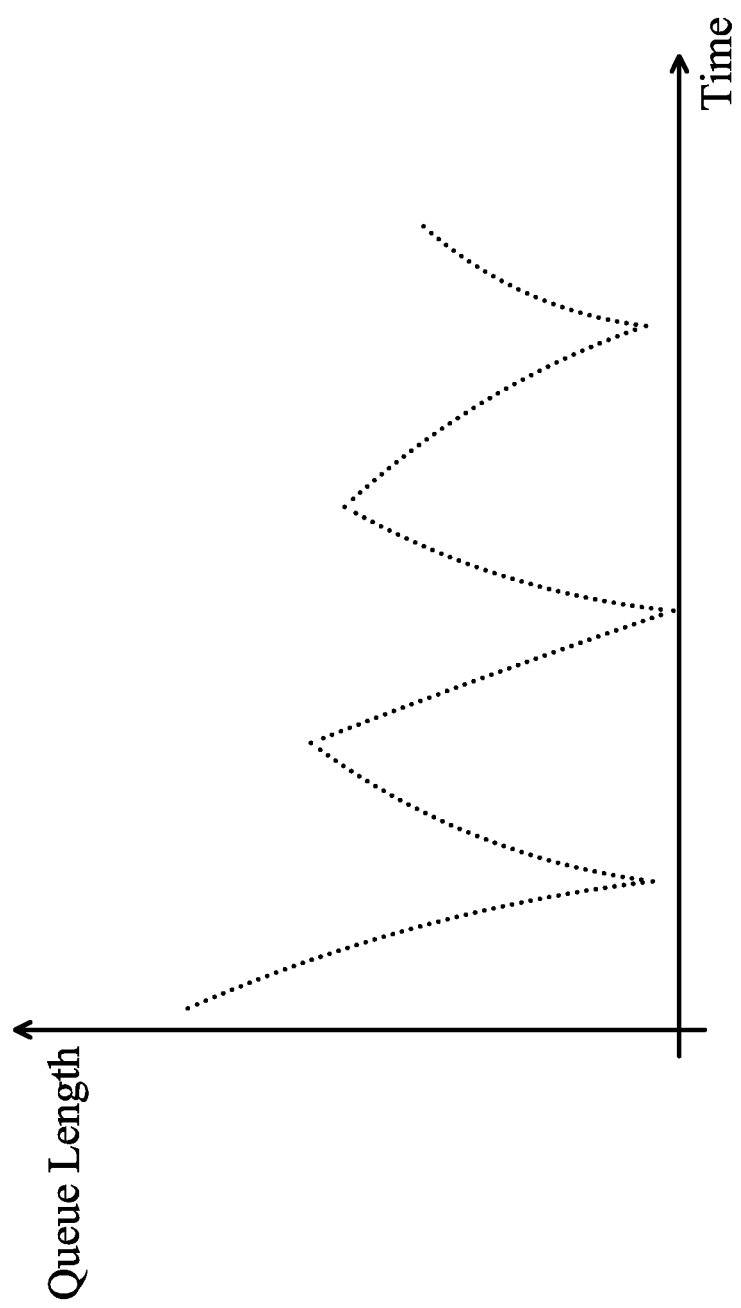
FIG. 4 is a structural diagram illustrating length of the cache writing data queue varying with time of a preferred embodiment of the present invention.

The method is called the clamping method. Its purpose is that the partial minimum is close to zero but not equal to zero when the length of the cache writing data queue in the cache varies with time, as illustrated in FIG. 4. If the length of the cache writing data queue is zero, the cache writing function will be idle during a certain period of time, and results in wastage. The portion of cache writing should be increased. On the contrary, if the data of cache writing is accumulated more and more, the length of the cache writing data queue will be too large. It cannot be reduced to a smaller value in a short time, and the ratio of direct writing should be increased to utilize the writing bandwidth provided by the storage medium more effectively.

When the upper limit Tbuf of the cache writing data queue could be dynamically adjusted, the writing data of the same length could be written using different methods corresponding to the variance of the upper limit Tbuf. However, a larger writing request is more likely to be written directly, and a smaller writing request is more likely to be cache written. Accordingly, corresponding optimization could be realized in association with system status and different requests.

The above method is adopted by the present disclosure. In cases where cache space is fixed, the intellectual writing could be realized from small data modules to large data modules, and from low development to high development. A better performance of bandwidth and latency could be obtained. It is also automatically and adaptively changeable, corresponding to the changing mode of the data flow. A reliable high performance could be achieved.

In addition, the cache and the direct writing determination module could perform direct writing to the cache for writing data (such as wear balance, garbage recycling) which is generated by all flash document system data manager FTL. Accordingly, the cache space could be saved to serve the user data more effectively and further improve the system performance.

The above embodiments are preferred and illustrative. People skilled in the art could, based on the description of the present disclosure, apply the disclosed methods to other storage mediums beside SSD, which is covered by the protection range of the patent.

What is claimed is:

1. A dynamic caching system for a data storage system, comprising a host interface, a controller, a cache and direct writing determination module, a cache module, a data writing channel, and a storage medium, wherein:
the host interface utilized to transmit a writing data command queue of an up-layer application;
the controller utilized to receive the writing data command queue from the host interface, to control devices comprising the cache and direct writing determination module, the cache module, the data writing channel, and to write data to the storage medium;
which is characterized by:
the cache and direct writing determination module performs a real-time determination for a corresponding data blocks of the writing data command queue from the controller, and adopts a direct writing or a cache writing for writing the corresponding data blocks; and
based on a determination result, the cache and direct writing determination module directly writes the corresponding data blocks which are direct writing to the storage medium through the data writing channel, or writes the corresponding data blocks which are writing to the storage medium after they are cached by the cache module, wherein adoption of the data writing or the cache writing is determined by an upper limit Tbuf of a length of the cached corresponding data blocks which is dynamically auto-adaptive.

2. The dynamic caching system as claimed in claim 1, wherein if cache writing is adopted for the current-requesting writing data results in the length of a cache writing data exceeding an upper limit Tbuf, direct writing is adopted for the current-requesting data, otherwise, cache writing is adopted for the current-requesting writing data.

3. The dynamic caching system as claimed in claim 1, when some cache writing is finished but the corresponding cache writing data in the cache is not empty, the upper limit Tbuf will be decreased by a smaller value, and when some cache writing is finished but the corresponding cache writing data in the cache is empty, the upper limit Tbuf will be increased by a larger value.

4. The dynamic caching system as claimed in claim 1, which is characterized by the cache and direct writing determination module adding a new cache writing command to a data queue which needs cache writing, re-constructing the data queue of cache writing, and removing the data from the cache module after the data cache is written to the storage medium.

5. The dynamic caching system as claimed in claim 1, wherein when a data blocks remains temporarily in the cache writing data, a reading operation is correspondingly performed to automatically obtain data from the cache queue rather than from the storage medium, in order to confirm data effectiveness and data consistency.

6. The dynamic caching system as claimed in claim 1, which is characterized by the cache and direct writing determination module assigning one kind of data for adopting direct writing or cache writing rather than dynamic determination.

7. The dynamic caching system as claimed in claim 2, which is characterized by the cache and direct writing determination module assigning one kind of data for adopting direct writing or cache writing rather than dynamic determination.

8. The dynamic caching system as claimed in claim 1, which is characterized by the storage medium being flash, SSD, queue based on traditional hard disk, or queue of next-generation storage medium, and the cache module is SRAM within the controller chip or an external DRAM.

9. The dynamic caching system as claimed in claim 2, which is characterized by the storage medium being flash, SSD, queue based on traditional hard disk, or queue of next-generation storage medium, and the cache module is SRAM within the controller chip or an external DRAM.

10. The dynamic caching system as claimed in claim 1, which is characterized by the cache and direct writing determination module being arranged in the controller.

11. The dynamic caching system as claimed in claim 2, which is characterized by the cache and direct writing determination module being arranged in the controller.

12. A dynamic caching method for a data storage system, which is characterized by:
performing a determination for a writing method of a currently-requesting writing data which needs writing; and
based on a determination result, directly writing the currently-requesting writing data which needs direct writing to the storage medium, and writing the currently-requesting writing data which needs cache writing to the storage medium after it is cached by a cache, wherein adoption of the data writing or the cache writing is determined by an upper limit Tbuf of a length of the cache writing data which is dynamically auto-adaptive.

13. The dynamic caching method as claimed in claim 12, wherein if the adoption of the cache writing for a current-requesting writing data results in the length of the cache writing data exceeding an upper limit Tbuf, direct writing is adopted for the current-requesting data; otherwise, cache writing is adopted for the current-requesting writing data.

14. The dynamic caching method as claimed in claim 13, when some cache writing is finished but the corresponding cache writing data in the cache is not empty, the upper limit Tbuf will be decreased by a smaller value, and when some cache writing is finished but the corresponding cache writing data in the cache is empty, the upper limit Tbuf will be increased by a larger value.

15. The dynamic caching system as claimed in one of claim 12, which is characterized by one kind of writing data being assigned for the adoption of direct writing to a storage medium.

16. The dynamic caching system as claimed in one of claim 13, which is characterized by one kind of writing data being assigned for the adoption of direct writing to a storage medium.

17. The dynamic caching system as claimed in one of claim 14, which is characterized by one kind of writing data being assigned for the adoption of direct writing to a storage medium.

18. The dynamic caching system as claimed in one of claim 12, which is characterized by the addition of a new cache writing command to a data queue which needs cache writing, re-constructing the data queue of cache writing, and removing the data from the cache after the data cache is written to the storage medium.

19. The dynamic caching system as claimed in one of claim 13, which is characterized by the addition of a new cache writing command to a data queue which needs cache writing, re-constructing the data queue of cache writing, and removing the data from the cache after the data cache is written to the storage medium.

20. The dynamic caching system as claimed in one of claim 14, which is characterized by the addition of a new cache writing command to a data queue which needs cache writing, re-constructing the data queue of cache writing, and removing the data from the cache after the data cache is written to the storage medium.

* * * * *